Dec. 23, 1941.   J. F. D. SMITH   2,267,312
RUBBER SPRING AND METHOD FOR MAKING SAME
Filed Feb. 8, 1940

INVENTOR
John F. D. Smith.
BY John P. Tarbox
ATTORNEY

Patented Dec. 23, 1941

2,267,312

UNITED STATES PATENT OFFICE 2,267,312

RUBBER SPRING AND METHOD FOR MAKING SAME

John F. Downie Smith, Philadelphia, Pa., assignor to Edward G. Budd Manufacturing Co., Philadelphia, Pa., a corporation of Pennsylvania Application February 8, 1940, Serial No. 317,933

7 Claims. (Cl. 267—63)

The present invention relates to torsion springs of the type wherein an annular element made of rubber or other material of similar mechanical characteristics, is subjected to torsion, usually by attaching it to an inner and outer relatively rigid member, one of which is then subjected to a turning moment with respect to the other so that the annular rubber element is subjected to what may be described as torsional shear.

More specifically described, the invention relates to torsion springs consisting of a rubber ring vulcanized or otherwise secured between two metal rings coaxial therewith.

A particular object of the invention is to increase the efficiency of such torsion springs by designing the elastic element to be of uniform torsional resistance throughout, whereby the stress per unit area is distributed practically uniformly throughout the elastic material, thus giving maximum effect for a given volume of elastic material or a given size of torsion spring.

A further specific object is to improve the design of such elastic torsion elements by modifying the shape of cross section thereof, in accordance with certain principles whereby an element of uniform stress may be approximated as closely as desired in any given instance, specifically by sub-dividing the elastic element into a plurality of coacting substantially parallel smaller elements, whereby such uniform distribution of stress is attained.

A still further specific object is to provide a plurality of coaxial elastic elements located within one another, for example, a torsion spring comprising a cylindrical core, a rubber element surrounding the same, a tubular metal member in turn surrounding the rubber, a further rubber element surrounding said tubular metal member, and finally a second tubular metal member enclosing the second rubber element, and wherein each of said elastic elements is preferably further sub-divided into a plurality of substantially annular members.

Other objects and advantages of the invention will in part be explained in detail hereinafter, while still others will be self-evident from the present specification, in connection with the drawing accompanying the same and forming a part thereof, which illustrates the principle of the invention and discloses several examples of various forms it may take.

In said drawing:

Fig. 3 is a similar diagram showing a further modified form of the elastic element, while

Figure 1:
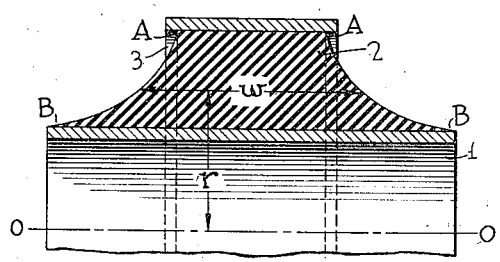
Fig. 1 is a diagrammatic representation showing the theoretical or ideal shape which must be given to a single annular elastic element secured to inner and outer torsion applying rings.

Referring to Fig. 1, there is illustrated a torsion spring comprising an elastic member 2 made of rubber or other material having suitable properties, a tubular member 1 being secured to the inner face of the annular member 2, as by vulcanizing or other suitable means, with a further tubular member 3 secured to the outer cylindrical surface of the member 2.

O—O designates the axis of the entire structure, and $r$ designates the radial distance from said axis to any cylindrical element of the elastic ring 2, said element being here shown as having an axial length $w$. It will be noted that the rubber member 2, when designed to be symmetrical, will be bounded at its ends by curved surfaces of revolution shaped somewhat as indicated by the lines A—B at each end.

Since the force or stress acting in any cylindrical element at a distance $r$ from the axis, acts on a moment arm of length $r$ while at the same time the circumferential area of said element is $2\pi rw$, the torsional resistance of the element will be $2\pi rws \times r = 2\pi r^2 ws$ where $s$ is the torsional stress in the rubber. This means that, in order to secure uniform stress, the width $w$ of said cylindrical element must vary inversely as $2\pi r^2$, or, more broadly expressed, the $r^2w=K$, wherein K is a constant dependent upon the allowable unit stress.

This relationship between $r$ and $w$ when plotted will give curves substantially like A—B. It will be noted that at the point B the thickness of the rubber is zero and that for a considerable distance inward from each point B the thickness of the rubber still is relatively slight, because there the curve has a small slope. Obviously the end portions of the rubber near the points B cannot adequately assume their proper share of the load, the result being that the portions further inward will be overstressed correspondingly.

The construction illustrated in Fig. 1, therefore, although mathematically correct, is not mechanically satisfactory, and such impractical form will exist whenever the radial extent of the elastic member is of anywhere near the same order of magnitude as the inner radius of the said elastic member. For example, if the outer radius of the rubber is twice the inner radius, then the distance from B to B would be four times the distance from A to A, in accordance with the above-derived formula.

Figure 2:
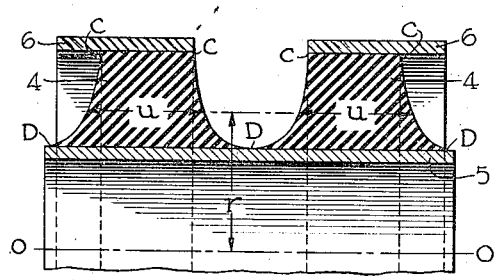
Fig. 2 is a diagram based on the above but showing how such elastic element may be subdivided to provide a mechanically practical form of torsion spring.

If now the rubber is divided as shown in Fig. 2, the conditions will be very much improved. In this figure, the two cylindrical portions 4 are bonded to a common inner tubular member 5 and individual outer tubular members 6. The width $u$ of both elements 4 at the same radius $r$, wherein $u=w/2$, jointly will be equivalent to the width $w$ of the former unitary element 2. However, each of the two portions 4 is here bounded by two curves C—D which at any given point will be twice as steep as the corresponding curves A—B, so that the relatively shallow end portions of the elastic member now become steeper and better fitted to assume their proper stresses. While two parallel ring shaped portions are illustrated in Fig. 2, it is obvious that any desired number may be provided. This entire spring assembly may be produced by vulcanizing in a form which has a configuration as to give the rubber the illustrated final form.

Figure 3:
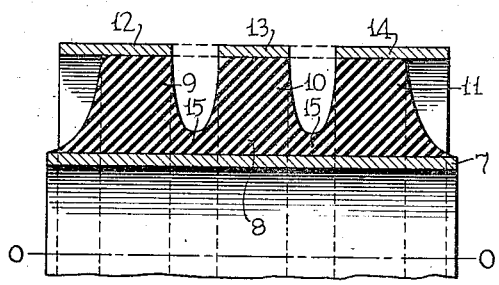

It is clear that a sufficiently close approximation to the theoretically correct form may be attained also by shaping the rubber member as shown in Fig. 3. In this form a single rubber member 8 is secured between the ring 7 and the rings 12, 13 and 14, and the rubber here consists substantially of three parallel rings 9, 10 and 11, which however are still joined to one another at the points 15 so as to constitute a single annular member, with two annular grooves therein. By thus providing three sections, the curve defining each end of each section becomes proportionately steeper and still better fitted to assume the proper loading.

Figure 4:
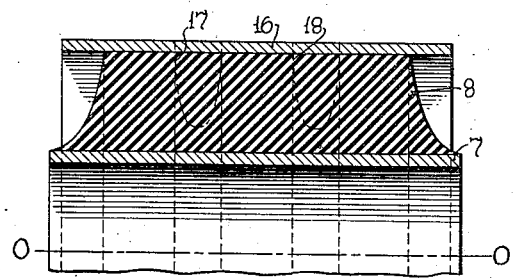
Fig. 4 illustrates an initial stage in making the same.

The form illustrated in Fig. 3 may be manufactured readily from an assembly consisting initially of an inner tubular member 7, an elastic ring such as 8 and an outer tubular member 16 as shown in Fig. 4, which is then modified by cutting annular grooves therein, as indicated by the dotted lines 17 and 18, to produce the structure shown in Fig. 3 (or a structure as shown in Fig. 2).

Figure 5:
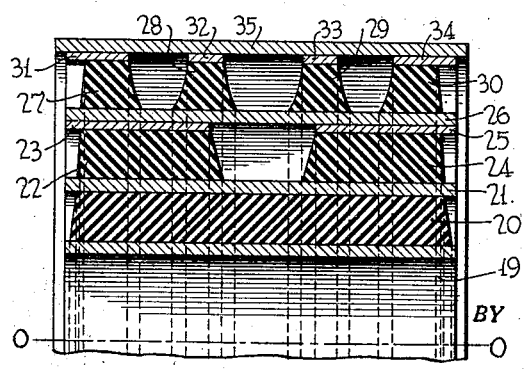
Fig. 5 is a diagram showing a torsion spring wherein several elastic elements are arranged concentrically.

Fig. 5 shows a further example of modified structure, comprising the central tube 19 to the outer surface of which is secured the elastic member 20, surrounded by and secured to the tubular member 21, to which are secured the parallel elastic rings 22 and 24, which in their turn are secured respectively to the insides of the tubes 23 and 25 which surround them, and which are secured to the enclosing tube 26 carrying still further elastic rings 27, 28, 29 and 30, enclosed by and secured to the respective outer tubular members 31, 32, 33 and 34.

The tubular members 23 and 25 may be secured to the tubular member 26 by welding in such a manner that the rubber and its bonding to the metal are not adversely affected, or in any other suitable manner. Preferably members 23 and 25 are made from a single initial tube, which is then cut apart as previously described in connection with Fig. 3, in order to provide the two rubber ring portions 22 and 24 by cutting apart a single original rubber tube. Of course, the final shape may also be achieved by an appropriate vulcanizing form as described in connection with Fig. 2.

By making the device in this way it is possible to cut the corresponding rubber tube, which could not be done if a single metal tube were provided in place of the separate section 23, 25, and 26. Likewise the rubber rings 27, 28, 29 and 30, together with the short tubular sections of metal 31, 32, 33 and 34, will preferably be manufactured by cutting apart a single initial outer tube enclosing a single rubber tube, in the same way.

It will be noted that the outer boundaries of the sections of rubber 22 and 24 are shown as substantially straight or radial, while the inner boundaries are inclined. While it is not necessary to give them this configuration, it gives the advantage of greater stability of the entire assemblage by bringing the rubber out nearer to the ends of the metal tubes. A similar construction may be applied to the rubber rings 27 and 30 for the same reason.

The separate outer sleeves 31, 32, 33, 34 are preferably rigidly fastened in the interior of one tube 35 which latter serves for connecting the spring assembly to one of the members (not shown) to be resiliently connected with each other. A similar unitary sleeve may suitably be used for the springs as shown in Figs. 2, 3 and 4.

While numerous forms of the invention have been specifically disclosed hereinabove, obviously many other forms are possible within the spirit of the invention. For instance, while curved boundaries of the rubber rings are shown in Figs. 1 to 4 inclusive, in Fig. 5 on the contrary some of the boundaries are shown as substantially straight in cross section. Due to the relatively large number of concentric subdivisions of the active rubber, such straight line boundaries afford an adequate approximation to the theoretical form and may perhaps be preferred in certain cases, on the ground that they are somewhat simpler in design and manufacture.

In all the forms disclosed the objective of providing a substantially uniform shearing stress throughout the elastic element is attained satisfactorily, and thereby useless rubber is eliminated while that which remains is increased in usefulness and length of life, by reason of the fact that none of it is overstressed and thus subject to premature destruction in service.

It must be clearly understood that while torsion springs having certain definite numbers of elastic rings or subdivisions have been disclosed, such numbers are arbitrary and are not intended in a limiting sense. For simplicity, the term "number" is used in the present case in its mathematical sense, to designate any positive integral number inclusive of unity.

For an understanding of the scope of the invention, attention is directed to the following claims.

I claim:

1. A torsion spring, comprising an axle member, a sleeve of resilient material secured at its inner surface to said axle member, said sleeve being circumferentially subdivided into a number of sections, each section decreasing in axial dimension as the radial distance from the axis of the axle increases, the outer circumferential surface of all said sections being attached to one common member capable of rotary movement with respect to said axle member.

2. A torsion spring, comprising an axle member, a sleeve of resilient material secured at its inner surface to said axle member, said sleeve being circumferentially subdivided into a number of sections, each section varying in axial dimension substantially inversely with the square of its radial distance from the axis of the axle, the outer circumferential surface of all said sections being attached to one common member capable of rotary movement with respect to said axle member.

3. A torsion spring, comprising an axle member, a sleeve of resilient material secured at its inner surface to said axle member, said sleeve being circumferentially subdivided into a number of sections, each section decreasing in axial dimension as the radial distance from the axis of the axle increases, each section having a separate relatively unyielding sleeve secured to its outer surface, said last-named sleeves being secured to one common member capable of rotary movement with respect to said axle member.

4. A composite torsion spring, comprising an axle member, a sleeve of resilient material secured at its inner surface to said axle member, a sleeve of relatively rigid material secured to the outer surface of the resilent sleeve, and a number of rings of resilient material secured to the outside of the rigid sleeve, the total axial thickness of said rings jointly being less than the axial thickness of the first-named resilient sleeve, the outer circumferential surface of said rings being secured to one common member capable of rotary movement with respect to said axle member.

5. A torsion spring, comprising a series of concentric sleeves, alternately of resilent and substantially rigid material, the material of each successively outer resilient sleeve being subdivided into an increasing number of substantialy separate rings, the total axial length of the resilient material at any radial distance from the central axis of the sleeves decreasing as the square of the radius.

6. A composite torsion spring, comprising an axle member, a sleeve of resilent material such as rubber being secured to the outside of said axle member and to the inner surface of a rigid sleeve, said resilient sleeve being subdivided by at least one circumferential groove which extends from its outer surface inwardly into a plurality of annular portions, a second rigid sleeve being secured to the outer surface of said annular resilient sleeve portions, a second sleeve of resilient material being secured to the outer side of said second rigid sleeve and being likewise subdivided by at least one annular grove into a plurality of annular portions, the axial dimensions of the portions of the inner and outer resilient sleeves being such that the specific stress in these sleeves exerted by torsional forces which act on the innermost rigid sleeve and on the outer circumference of the outer resilient sleeve is throughout about the same.

7. A torsion spring, comprising an axle member, a sleeve of resilient material having its inner surface secured to said axle member, said sleeve being circumferentially subdivided into a number of sections, each section decreasing in axial dimension as the radial distance from the axis of the axle increases, each section having a separate, relatively unyielding sleeve secured to its outer surface, said separate sleeves being surrounded and rigidly connected to one common rigid member.

JOHN F. DOWNIE SMITH.

DISCLAIMER 2,267,312.—*John F. Downie Smith*, Philadelphia, Pa. RUBBER SPRING AND METHOD FOR MAKING SAME. Patent dated December 23, 1941. Disclaimer filed January 12, 1944, by the assignee, *Edward G. Budd Manufacturing Co.*

Hereby enters this disclaimer to claims 1, 2, 3, and 7 of said patent.

[*Official Gazette February 8, 1944.*]